Oct. 18, 1932.  W. DOWLING  1,883,770

LINK MECHANISM

Filed Sept. 10, 1929  3 Sheets-Sheet 1

INVENTOR
William Dowling
by *[signature]*
ATTORNEY

Oct. 18, 1932.   W. DOWLING   1,883,770
LINK MECHANISM
Filed Sept. 10, 1929   3 Sheets-Sheet 2

INVENTOR
William Dowling
by *Herbert J. Rector*
ATTORNEY

Oct. 18, 1932.  W. DOWLING  1,883,770

LINK MECHANISM

Filed Sept. 10, 1929  3 Sheets-Sheet 3

INVENTOR
William Dowling
by
ATTORNEY

Patented Oct. 18, 1932

1,883,770

UNITED STATES PATENT OFFICE

WILLIAM DOWLING, OF EAST MALVERN, VICTORIA, AUSTRALIA

LINK MECHANISM

Application filed September 10, 1929, Serial No. 391,628, and in Australia September 13, 1928.

This invention relates to improvements in and connected with a link mechanism adaptable for a variety of purposes, such for example as the propulsion of watercraft and land vehicles and guiding or controlling the movement of parts of different machines.

One important application of the invention relates to means for gathering crop and feeding the same into the combs of harvesters, reapers and binders and the like.

The invention briefly comprises a link mechanism consisting of one main arm pivotally mounted on a suitable frame, an operating arm pivotally connected to the free end of the main arm and provided at its free end with operating means, a connecting rod pivotally connected at one end to an intermediate portion of the main arm and at its opposite end to a crank rotatably mounted on the frame, and a link connection between the connecting rod and the operating arm.

The operating means adapted to the free end of the operating arm may be traction shoes, paddles or vanes, crop gathering arms or rakes or other tools depending upon the application of the invention.

Having briefly set forth the object and nature of the invention, reference will now be had to the accompanying drawings wherein:—

Figure 3 is a view in side elevation showing how three pairs of link mechanisms according to the present invention may be applied for gathering crop and feeding the same in the combs of a harvesting machine, reaper and binder or the like.

Figure 1:
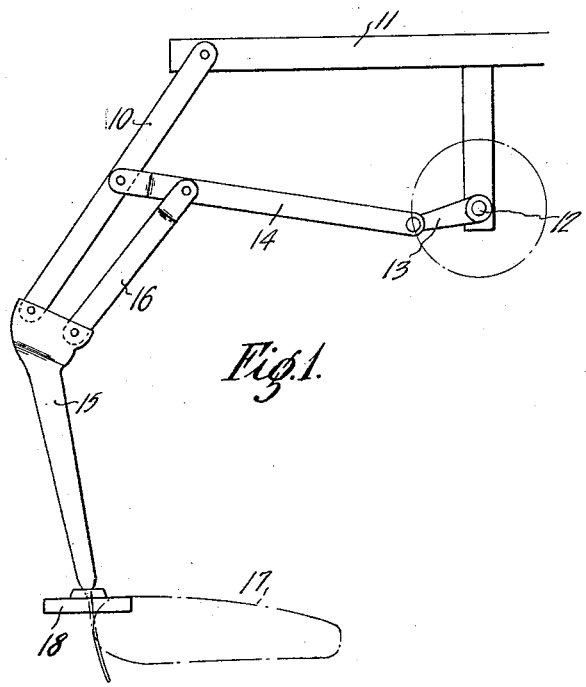
Figure 1 is a view in side elevation of a link mechanism constructed in accordance with the present invention.
Figure 2:
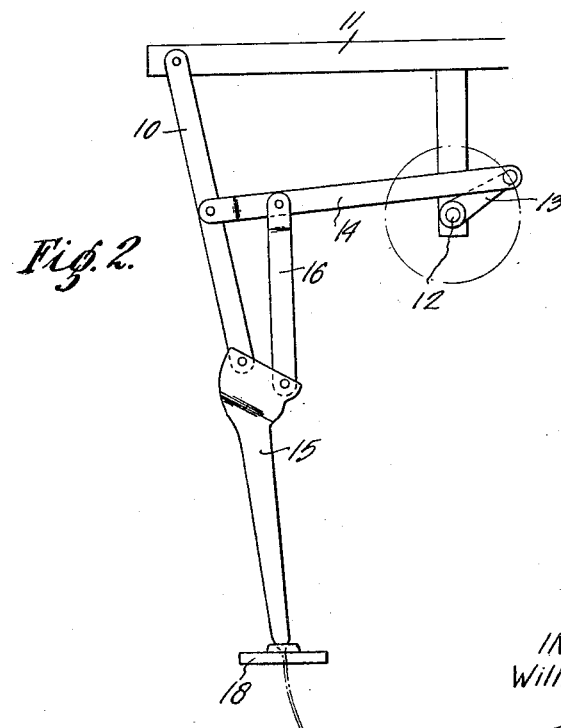
Figure 2 is a view similar to Figure 1 and shows the link mechanism in a different position.

Figures 1 and 2 of the drawings illustrate the link mechanism forming the subject matter of the present invention as applicable for a variety of purposes, and referring thereto, the reference numeral 10 designates a main arm which is pivotally connected at its upper end to a suitable frame or supporting member 11.

A crank-shaft 12 is rotatably carried by this frame and the crank 13 thereon is connected by means of a connecting rod 14 to an intermediate portion of the main arm 10.

An operating arm 15 is pivotally mounted on the lower or free end of the main arm 10 and a link 16, having one of its ends pivotally connected to an intermediate portion of the connecting rod 14, has its opposite end connected to a lug or extension on the upper end of the operating arm 15.

When the crankshaft 12 is rotated in either direction the lower end of the operating arm 15 is moved through a closed path indicated by the dotted lines 17 in Figure 1.

The lower end of the operating arm is provided with an operating means 18, the nature of which varies according to the application made of the invention.

For example, the operating means shown in full lines constitutes a traction shoe, and is adapted to be utilized when the invention is applied to impart movement to a vehicle, such, for example, as a farm tractor or the like, by simulating walking movements.

When used for this purpose, a plurality of units, similar to that shown in Figure 1 may be arranged on each side of the tractor chassis, suitable mechanism being provided for operating the crankshaft or shafts 12 from the engine of the tractor.

The traction shoes are preferably provided with knuckle or resilient joints by means of which they are permitted to accommodate themselves to irregularities in the ground surface and to press evenly thereagainst during the walking movements, and the said shoes have sufficient bearing area to prevent any undue sinking into soft and boggy ground.

If desired, the usual rear or driving wheels of the tractor may be removed, but they are preferably retained to ensure stability.

In order to effect turning movements, differential or other mechanism may be provided for increasing the length of the strides or steps taken by those units disposed on the outer side of a curve while reducing the length of those on the inner side; or alternatively, mechanism may be arranged to increase the number of steps taken by the outer units as compared with the inner units.

The first of these adjustments may be carried out by providing means for regulating the length of the cranks 13 and the second by providing means for differentially varying the rate of rotation of the said cranks.

In a modified form of the invention, the link 16 may be of telescopic or resilient construction, whereby, when the tractor or like vehicle is turning, the springs in the links 16 of the inner units are automatically compressed, thus resulting in shorter steps being taken thereby.

When the link mechanism shown in Figures 1 and 2 is adapted to be employed for propelling a boat or the like, the operating means 18 may take the form of a paddle (indicated in chain dotted lines) a suitable structure or frame being provided for supporting the link mechanism and driving cranks whereby said paddles may engage the water on either side thereof to propel the boat or other craft.

It will be appreciated that any driving means may be provided for imparting rotation to the cranks 13.

It will be obvious that, by varying the proportion of the different members of the mechanism, different movements may be imparted to the operating means.

Figures 3 to 6 show the invention as employed for gathering crop and feeding the same into the combs of a harvester, reaper and binder, or the like.

In this construction, the crank shaft 12 is mounted above the comb 19 of the implement, and is supported in bearings carried on upwardly projecting supports 20 secured to the adjustable frame 21 of the harvesting or like machine. These upwardly projecting supports 20 are suitably stayed as by curved members 22.

The main arms 10 of the link mechanism units are pivotally supported at their upper ends on bearing brackets 23 secured to an auxiliary frame 24 the end members 25 of which are pivotally mounted about the crankshaft 12.

Adjacent cranks 13 of the crankshaft are preferably disposed at an angle of 180° as shown, but this is not essential.

Links 26 may adjustably connect the end members 25 of the auxiliary frame to curved extensions 27 on the upwardly projecting supports 20, whereby the position of the auxiliary frame may be adjusted for a purpose hereinbefore set forth.

The lower ends of the operating arms 15 are fitted with horizontally disposed rakes comprising beams or bars 28 provided with depending prongs or fingers 29.

If desired, however, the prongs or fingers may be dispensed with and plain battens may be employed.

The rakes arranged adjacent to each end of the comb 19 are supported at their outer ends, whilst the bars or beams 28 fitted to the intermediate operating arms are supported at or about their centers.

Suitable struts 30 (Fig. 4) are provided for ensuring rigidity of the bars or beams 28.

One end of the crankshaft 12 may be fitted with a sprocket 31 (Fig. 3) adapted to be actuated by means of a chain 32 from a sprocket 33 supported on the frame of the implement, and suitable means (not indicated in the drawings) may be provided for imparting movement thereto from the operative parts of the machine.

Figure 3:
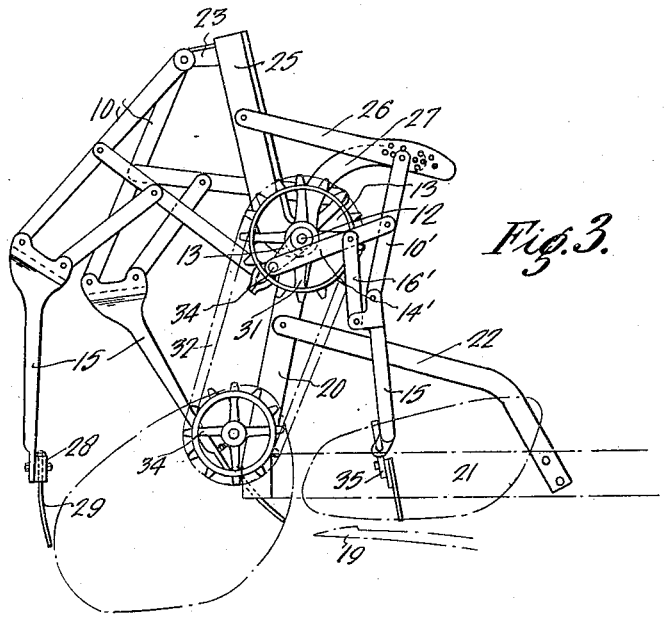
Figure 4:
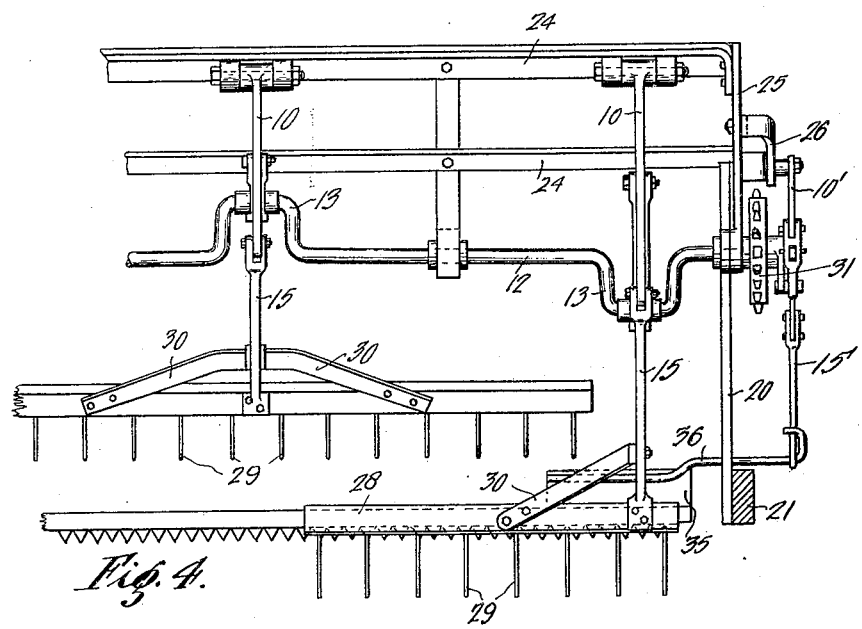
Figure 4 is a view in front elevation of a portion of the machine shown in Figure 3.
Figure 5:
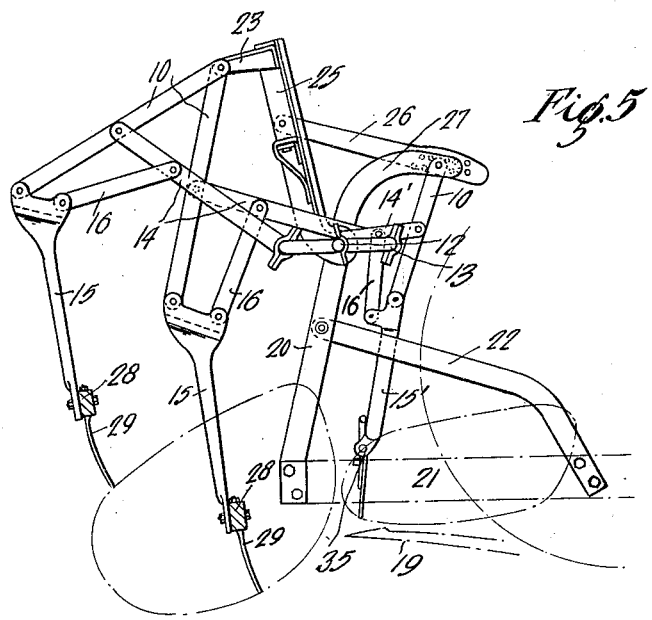
Figures 5 and 6 are detail views in end elevation corresponding to Figure 3 and showing the link mechanisms in different positions which hereinafter will be fully described.
Figure 6:
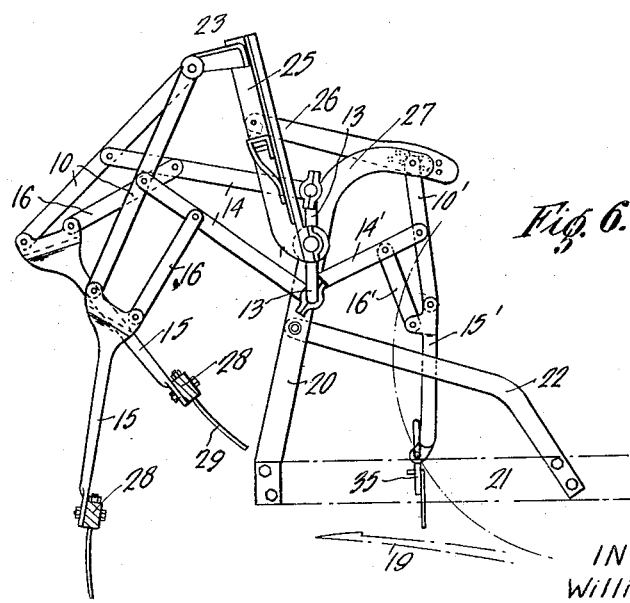

When the crankshaft is rotated in either direction the rakes on the lower ends of the operating arms 10 are moved through a closed path which is indicated in broken lines in Figure 3, thus raking or sweeping the crop into the comb, where it is severed and gathered in any well known way.

The speed of the rakes or like means is so regulated as to exceed the forward movement of the harvester or like machine, it being understood that, during their forward movements, the rakes are elevated above the top of the crop being cut and that, during the return or rearward movement, the lower ends of the prongs or fingers 29 are below the top of the crop which is thus fed to the comb of the machine.

It will be noted that the bars or beams 28 supporting the rake fingers 29 overlap between each adjacent pair of operating arm 10, but this occasions no difficulty as the same are 180° out of phase, so that one is lifted clear when the other is moving the crop in towards the comb 19.

By adjusting the position of the auxiliary frame 24 by means of the links 26 as previously described, the prongs or fingers may be adjusted so that their path of movement is higher or lower as desired, thus making it possible to handle down crop with facility. If desired, the auxiliary frame may be fitted non-adjustably to the supporting members 20.

In lieu of providing the link mechanism units with individual rakes or battens as indicated in Figures 3 to 6 of the drawings, one or more pairs of said units may be employed.

In this construction, the actuating cranks for each pair of link mechanism units are arranged in phase, thereby permitting of a batten or rake being supported by each adjacent pair of units.

If desired, an auxiliary gathering device may be arranged above the comb of the machine and adapted to direct the severed heads of the crop into the usual conveying mechanism.

This auxiliary device may comprise main arms 10' pivotally connected at their upper ends to the extensions 27 on the upwardly projecting supports 20. These main arms 10' are connected intermediate their ends by connecting rods 14' to cranks 34 rigidly fitted to the ends of the crankshaft 12. The lower ends of the main arms 10' are pivotally connected to the upper ends of operating arms 15' provided with lateral extensions connected by means of links 16' to an intermediate portion of the connecting rod 14'.

A transversely disposed batten 35 is oscillatably mounted on the lower ends of the operating arms 15'.

In the construction shown in the drawings, (Fig. 3) the batten 35, is fitted at opposite ends with longitudinal extensions 36 which are pivotally mounted in the lower ends of the operating arms 15'. The ends of the longitudinal extensions are turned upwardly and inwardly in advance of the operating arms 15', as shown clearly in Figures 3 and 4.

By means of this construction, the batten 35 is held rigidly whilst the latter is being moved rearwardly over the comb and is permitted to feather over any obstruction when moving in a forward direction.

The proportions of the link mechanism last-mentioned are so arranged that the lower end of the batten 35, during its rearward movement, moves substantially close to and parallel with the comb of the machine, thereby brushing or delivering the severed heads of the crop to the conveying mechanism on the machine.

If desired, the auxiliary gathering mechanism may be used on machines not fitted with the main gathering and feeding mechanism previously described.

It will be appreciated that the proportions of the link mechanism and the relative disposition of the parts may be adjusted to produce desired variations in the movement or orbital path traversed by the fingers or prongs 29 or the batten 35.

In a further modification of the invention, a plurality of inverted link mechanisms similar to that indicated in Figures 1 and 2 may be arranged in series and adapted to operate alternately whereby the same will function as a straw walker in a reaper thresher or like harvesting machine, and, if preferred, short laterally extending battens may be fitted to the ends of the operating arms to facilitate the conveyance and agitation of the straw passing thereover.

I claim:

1. Link mechanism including a main arm pivotally mounted on a suitable frame, a crank rotatably mounted on this frame, an operating arm pivotally connected to the free end of the main arm and provided at its free end with operating means, a connecting rod pivotally connected at one end to an intermediate portion of the main arm and at its opposite end to the crank and a link connection between the connecting rod and the operating arm.

2. Link mechanism including the combination, with a frame, of a plurality of units, each of which is provided with a main arm pivotally mounted upon the frame and having a free end, a crank, an operating arm pivoted to the free end of said main arm and having a lower operating end, a connecting rod pivoted at one end thereof to said crank and at the other end pivoted to a portion of said main arm, and a link connection between said connecting rod and said operating arm, there being operating means disposed upon the lower operating end of said operating arm.

In witness whereof I hereunto affix my signature.

WILLIAM DOWLING.